Feb. 24, 1925.
A. WIHEBRINK
CHILD'S VEHICLE
Filed Jan. 5, 1924
1,527,287
2 Sheets-Sheet 1
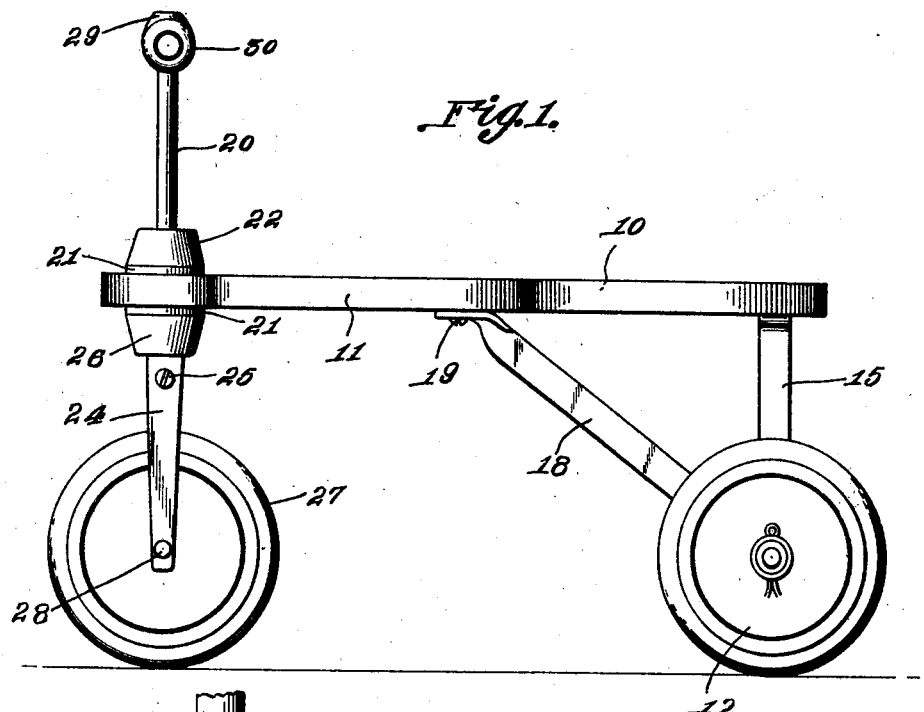
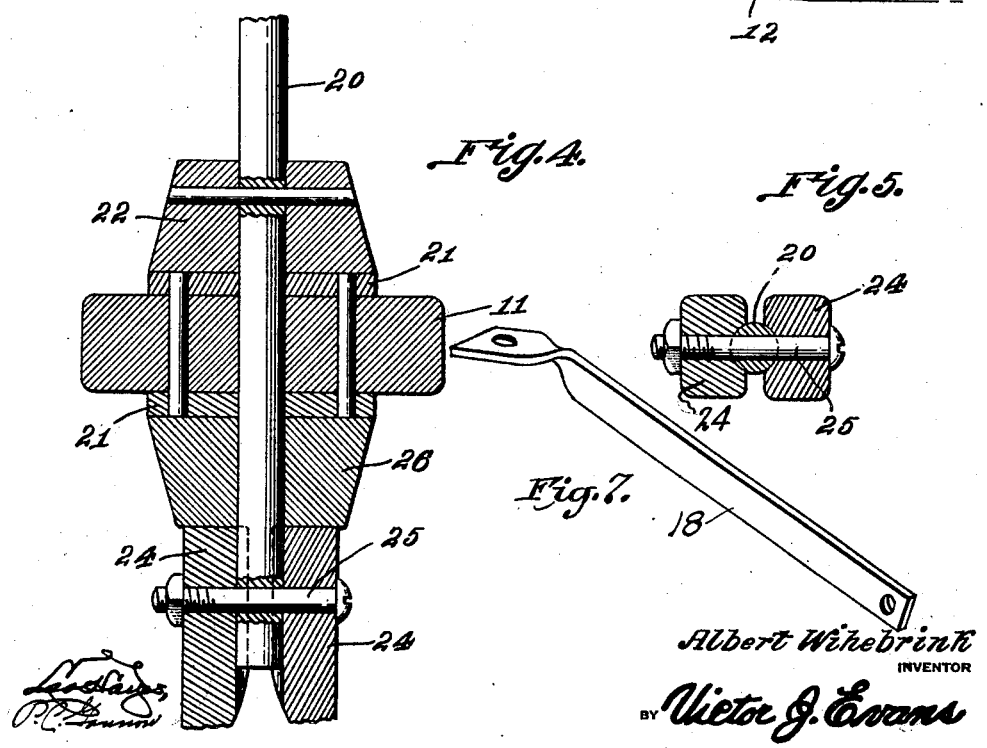
Albert Wihebrink
INVENTOR
BY Victor J. Evans
ATTORNEY
WITNESS:

Feb. 24, 1925.
A. WIHEBRINK
CHILD'S VEHICLE
Filed Jan. 5, 1924
1,527,287
2 Sheets-Sheet 2
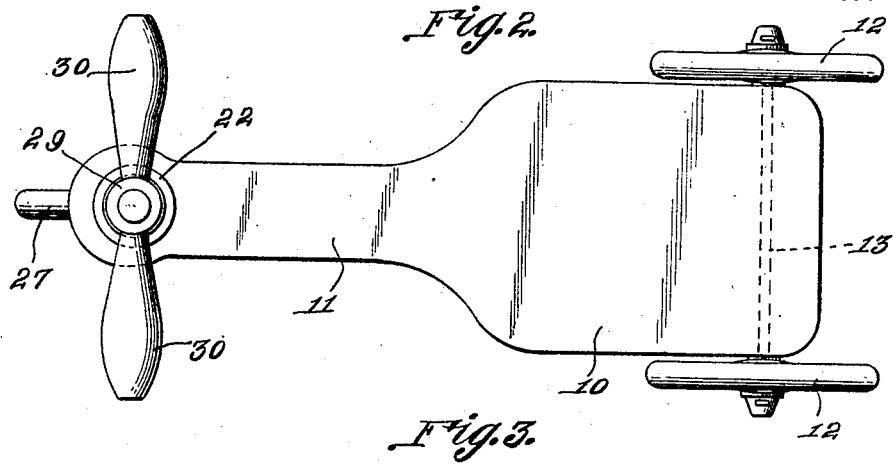
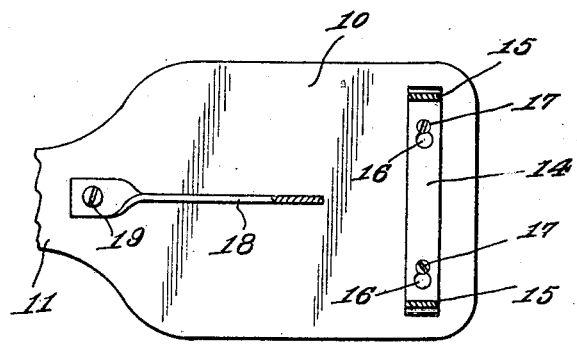
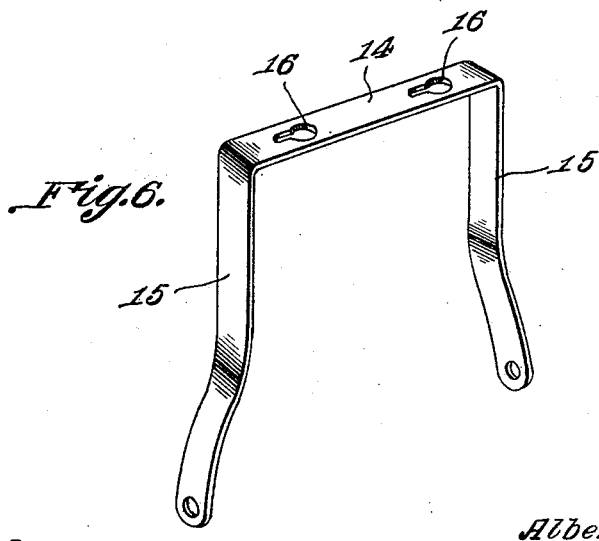
Albert Wihebrink
INVENTOR
BY Victor J. Evans
ATTORNEY
WITNESS:

Patented Feb. 24, 1925.

1,527,287

UNITED STATES PATENT OFFICE.

ALBERT WIHEBRINK, OF ANDERSON, INDIANA.

CHILD'S VEHICLE.

Application filed January 5, 1924. Serial No. 684,605.

*To all whom it may concern:*

Be it known that I, ALBERT WIHEBRINK, a citizen of the United States, residing at Anderson, in the county of Madison and State of Indiana, have invented new and useful Improvements in Children's Vehicles, of which the following is a specification.

This invention relates to children's vehicles and has for an object the provision of a wheel supported vehicle of knock-down construction, so that the vehicle may be packed for transportation and quickly and easily set up.

To this end, the invention further aims to provide novel means of connection between the body and the rear wheels, so that the latter may be readily and securely attached in place, together with novel means of attaching a front or steering wheel so that the latter may also be attached to provide a steering wheel which is easily manipulated.

A further object of the invention is the provision of a vehicle of this character which is simple and durable in construction, attractive in appearance and which will afford considerable amusement and exercise for a child.

With the above and other objects in view, the invention further includes the following novel features and details of construction, to be hereinafter more fully described, illustrated in the accompanying drawings and pointed out in the appended claims.

In the drawings:—

Figure 1 is a side elevation of a child's vehicle constructed in accordance with the invention.

Figure 2 is a top plan view.

Figure 3 is a fragmentary horizontal section taken on a line above the rear wheels and looking upward toward the body.

Figure 4 is an enlarged vertical sectional view through the steering bar connection.

Figure 5 is a horizontal section showing the connection between the steering bar and front forks.

Figure 6 is a detail perspective view of the rear bearing bracket.

Figure 7 is a detail perspective view of the brace.

Referring to the drawings in detail wherein like characters of reference denote corresponding parts, the reference character 10 indicates the body of the vehicle which is provided with a reduced extended portion or neck 11, whereby a child may be seated upon the body with its legs positioned upon opposite sides of the neck, as is usual in vehicles of this character.

The body is supported at its rear end by means of wheels 12 and the latter are secured upon opposite ends of an axle 13. This axle is mounted in a bearing bracket which includes a transverse bar 14 and downwardly extending side arms 15 which project from opposite ends of the bar and which are provided with openings for the passage of the axle 13. The bar 14 is provided with keyhole slots 16, while the body 10 has extending therefrom headed screws 17 or similar devices, so that the large ends of the keyhole slots may be passed over the heads of the screws and the bracket moved transversely of the body to engage the screws in the restricted ends of the slots 16.

In order to prevent accidental movement of the bearing bracket with respect to the body there is provided a brace 18, one end of which is provided with an opening for the passage of the axle 13. The opposite end of this brace is provided with an opening for the passage of a screw or bolt 19 which is engaged in the body 10, the point of engagement of this screw or bolt being such as to cause a binding action between the bar 14 and the heads of the screws 17 so that the bearing bracket will be securely held in place.

The forward end of the neck 11 is provided with an opening for the passage of a steering rod 20 and secured to the upper and lower faces of the neck around this opening are apertured bearing disks 21. Secured to the rod 20 is a bearing collar 22 which bears upon the upper disk 21. The lower end of the steering rod 20 is connected between forks 24, a bolt 25 extending through the upper ends of these forks and through the rod 20 to provide a removable connection. Interposed between the upper end of the forks 24 and the lower bearing disk 21 is a removable bearing collar 26, while a steering wheel 27 is mounted between the forks upon an axle 28.

The upper end of the rod 20 has secured thereon a head 29, while extending from opposite sides of this head are handles or grips 30.

It will be apparent from the foregoing description and accompanying drawings that the invention provides a toy vehicle of a knock-down character which may be readily set up or taken apart. The slots in the bar 14 are engaged over the headed screws 17 and the bar moved transversely of the body so as to engage the screws. The inclined brace is then properly adjusted so as to hold the bar against accidental movement.

The steering rod 20 is passed through the bearing disks 21 and the lower bearing collar 26 placed upon the rod and after the bolt 25 is passed through the front forks and the lower end of the rod 20, the vehicle will be complete.

The invention is susceptible of various changes in its form, proportions and minor details of construction and the right is herein reserved to make such changes as properly fall within the scope of the appended claims.

Having described the invention what is claimed is:—

1. A toy vehicle comprising a body, an inverted substantially U-shaped bracket including a transverse bar and downwardly extending bearing arms at each end of the bar, an axle mounted in the bearing arms, wheels upon each end of the axle, means connecting the transverse bar and body, constructed so that said bar may be moved transversely of the body to connect and disconnect said bar, means connecting the axle and body to hold the bar against movement, and a front steering wheel for the vehicle.

2. A toy vehicle comprising a body, an inverted substantially U-shaped bracket including a transverse bar and downwardly extending bearing arms at opposite ends of the bar, an axle mounted in the bearing arms, wheels upon each end of the axle, a screw and slot connection for detachably connecting the transverse bar to the bottom of the vehicle, an inclined brace having one end secured to the axle, means connecting the opposite end of the brace to the body to hold the axle against movement longitudinally of the body and to prevent accidental disengagement of the transverse bar and body, and a front steering wheel for the vehicle.

3. A toy vehicle comprising a body, rear supporting wheels, a front steering wheel, steering forks, a steering bar extending from the body, upper and lower bearing disks secured to the body and receiving the steering bar, a bearing collar secured to said bar and engaging the upper disk, a bearing collar positioned upon the bar between the lower disk and forks, and means detachably connecting the bar and forks.

In testimony whereof I affix my signature.

ALBERT WIHEBRINK.